US009096095B2

(12) United States Patent
Hedley

(10) Patent No.: US 9,096,095 B2
(45) Date of Patent: Aug. 4, 2015

(54) HANDLING DEVICE AND METHOD

(75) Inventor: Robert Ian Hedley, Buttaba (AU)

(73) Assignee: Justoy Pty Ltd, Mount Thorley via Broke, NSW (AU)

(*) Notice: Subject to any disclaimer, the term of this patent is extended or adjusted under 35 U.S.C. 154(b) by 461 days.

(21) Appl. No.: 13/028,120

(22) Filed: Feb. 15, 2011

(65) Prior Publication Data
US 2011/0197416 A1 Aug. 18, 2011

(30) Foreign Application Priority Data

Feb. 17, 2010 (AU) ................................ 2010900650

(51) Int. Cl.
*B60B 29/00* (2006.01)
*B60B 30/00* (2006.01)
(52) U.S. Cl.
CPC ................. *B60B 29/00* (2013.01); *B60B 30/00* (2013.01); *Y10T 29/49819* (2015.01); *Y10T 29/49826* (2015.01)
(58) Field of Classification Search
CPC .. B60B 29/001; B60B 29/002; B60B 29/008; B62B 2202/031
USPC .......................... 414/426–429, 470; 280/763.1
See application file for complete search history.

(56) References Cited

U.S. PATENT DOCUMENTS

| 1,964,119 | A | * | 6/1934 | William Hendry | ............ 414/427 |
| 3,830,387 | A | * | 8/1974 | Virnig | ............ 414/427 |
| 3,951,287 | A | * | 4/1976 | Cofer | ............ 414/427 |
| 4,042,139 | A | * | 8/1977 | Pernsteiner et al. | ............ 414/427 |
| 4,123,038 | A | * | 10/1978 | Meyers | ............ 254/2 R |
| 5,505,578 | A | * | 4/1996 | Fuller | ............ 414/427 |
| 6,196,586 | B1 | * | 3/2001 | Messenger | ................ 280/763.1 |
| 7,114,747 | B2 | * | 10/2006 | Dix et al. | ................... 280/764.1 |
| 2005/0254923 | A1 | * | 11/2005 | Gorski et al. | ................ 414/426 |
| 2008/0089766 | A1 | * | 4/2008 | Hammonds | ................... 414/429 |

* cited by examiner

*Primary Examiner* — Jonathan Snelting
(74) *Attorney, Agent, or Firm* — Kilpatrick Townsend & Stockton LLP

(57) ABSTRACT

An apparatus (1) for transporting an article (2). The apparatus (1) includes a frame (3) and an article support (4) operatively coupled to the frame (3). The article support (4) is movable relative to the frame (3) such that the apparatus (1) provides a first configuration for retaining the article (2) and a second configuration for receiving or unloading the article (2). The apparatus (1) includes a plurality of wheels (9) for movement over a substrate surface, and, a stabilizing means (6) to engage the substrate surface and stabilize the frame (3) when the apparatus (1) is in the extended position. In use, the apparatus (1) may be used to support a wheel, tire or other vehicular component (2) during installation, for example, in a confined space such as a mine.

16 Claims, 12 Drawing Sheets

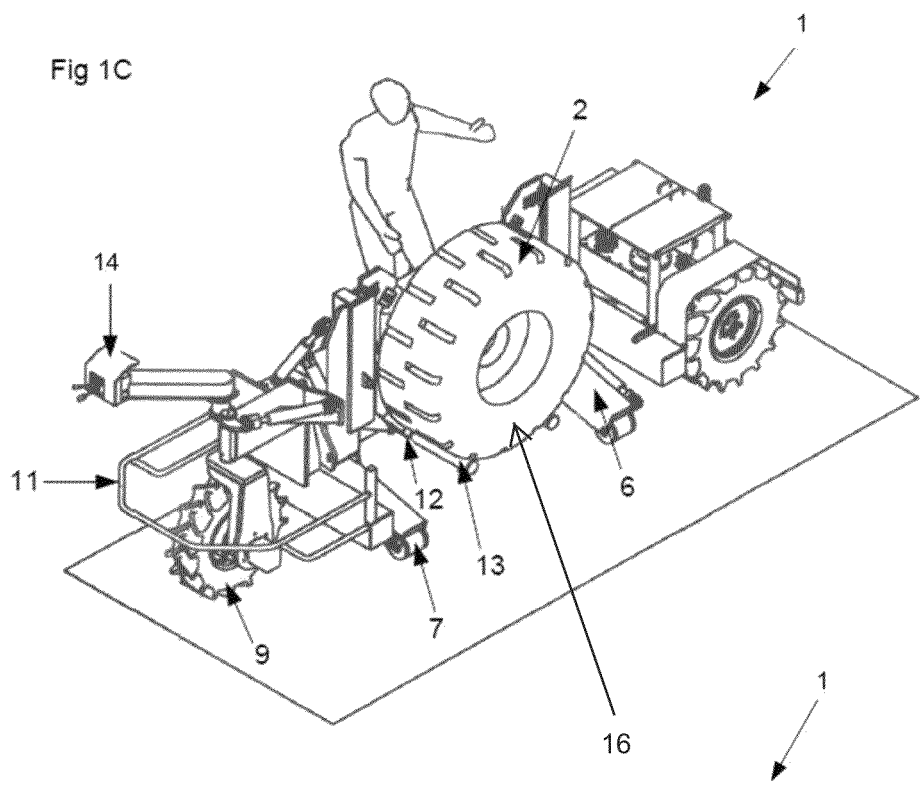
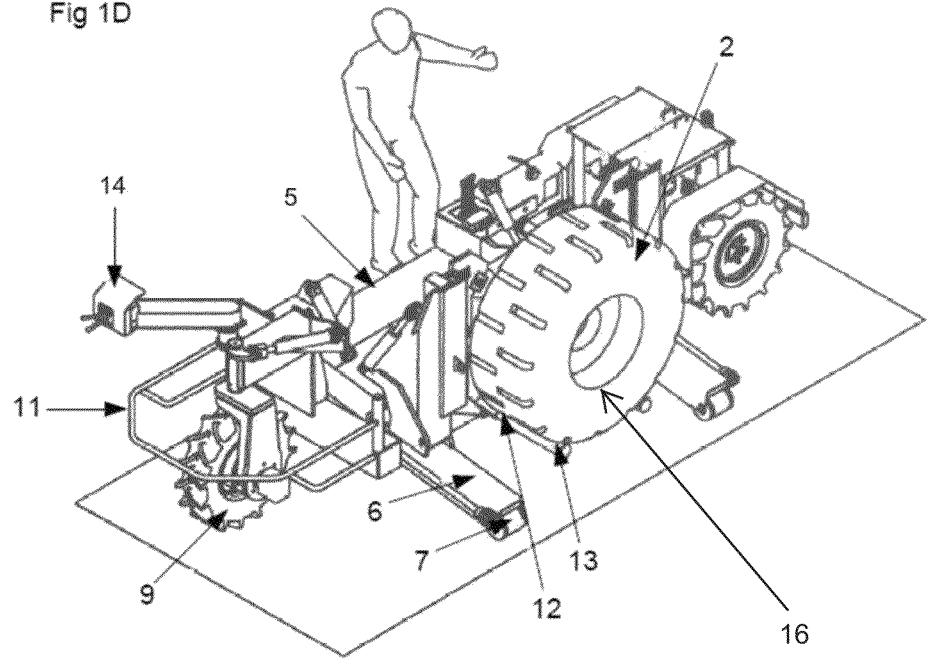

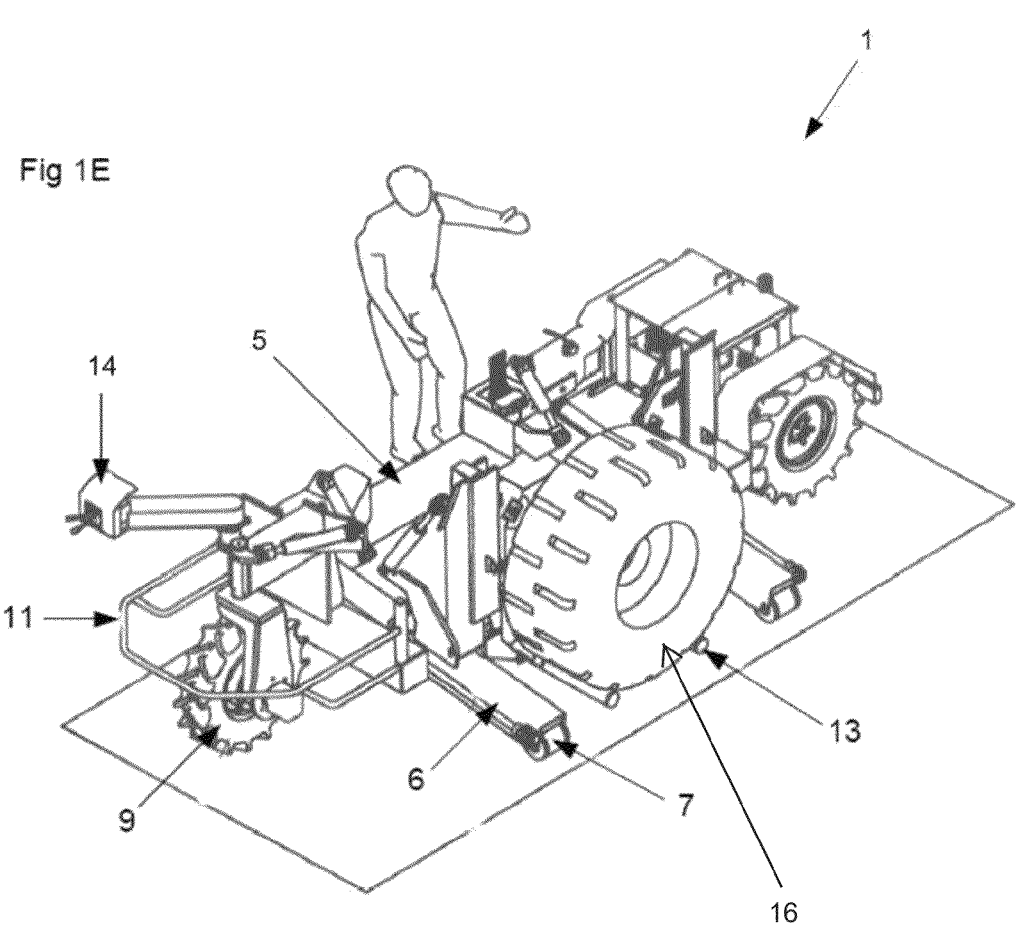

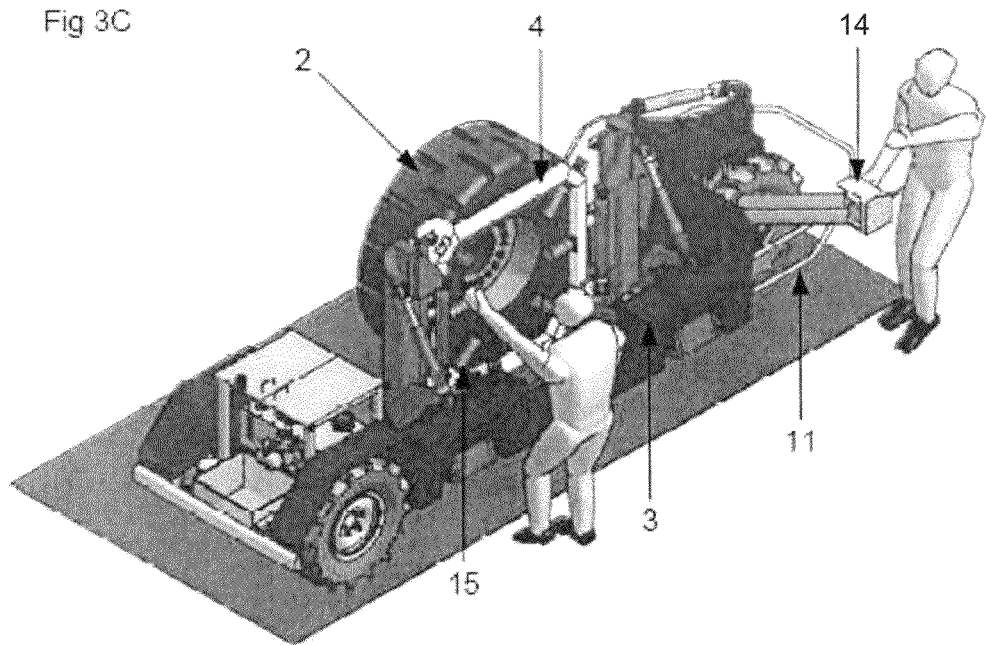
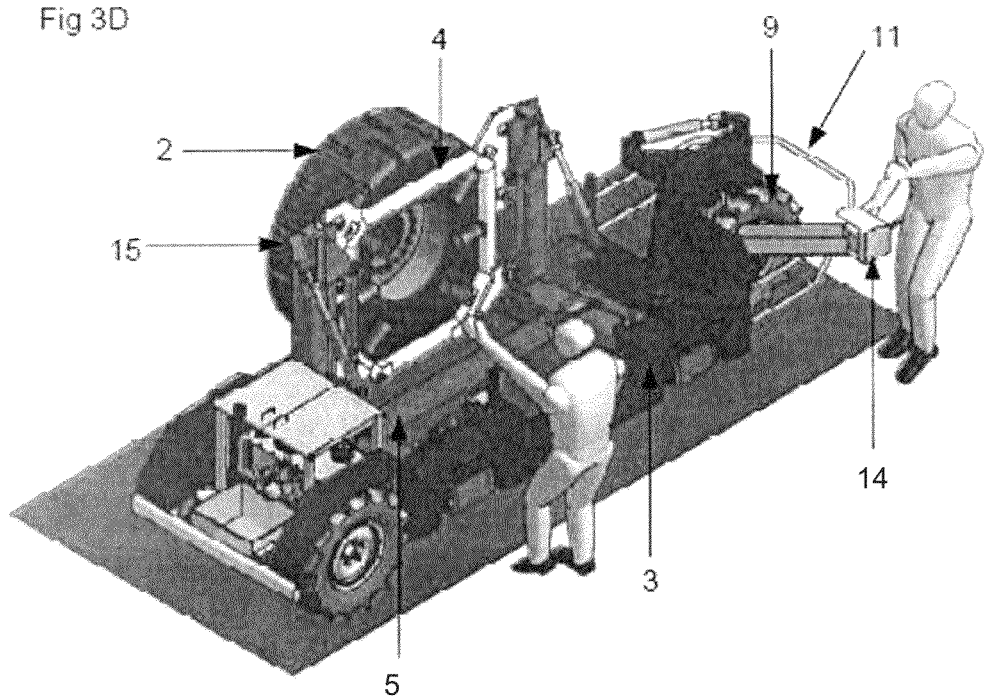

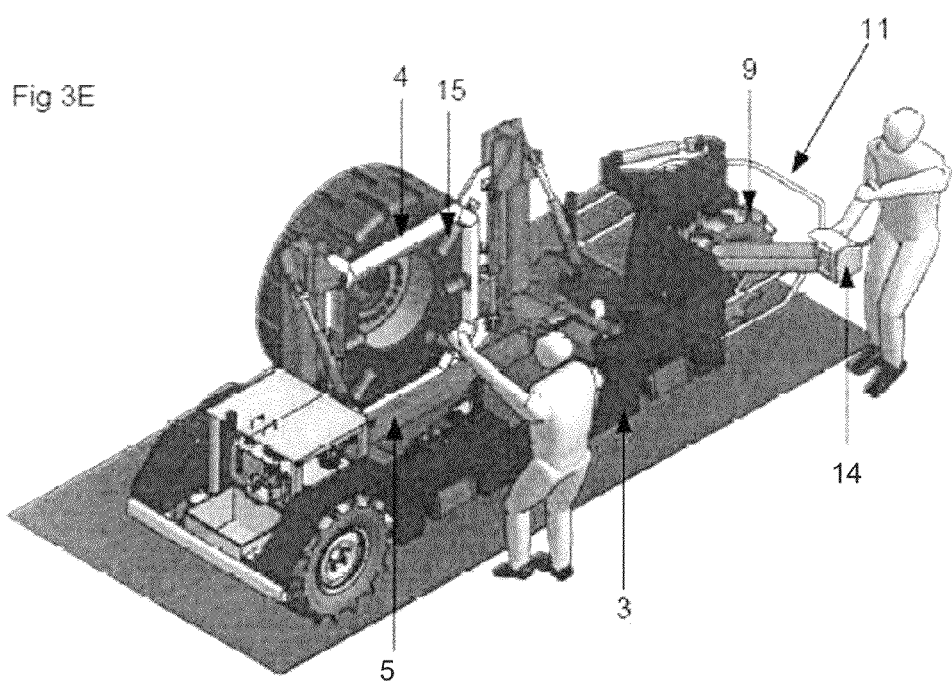

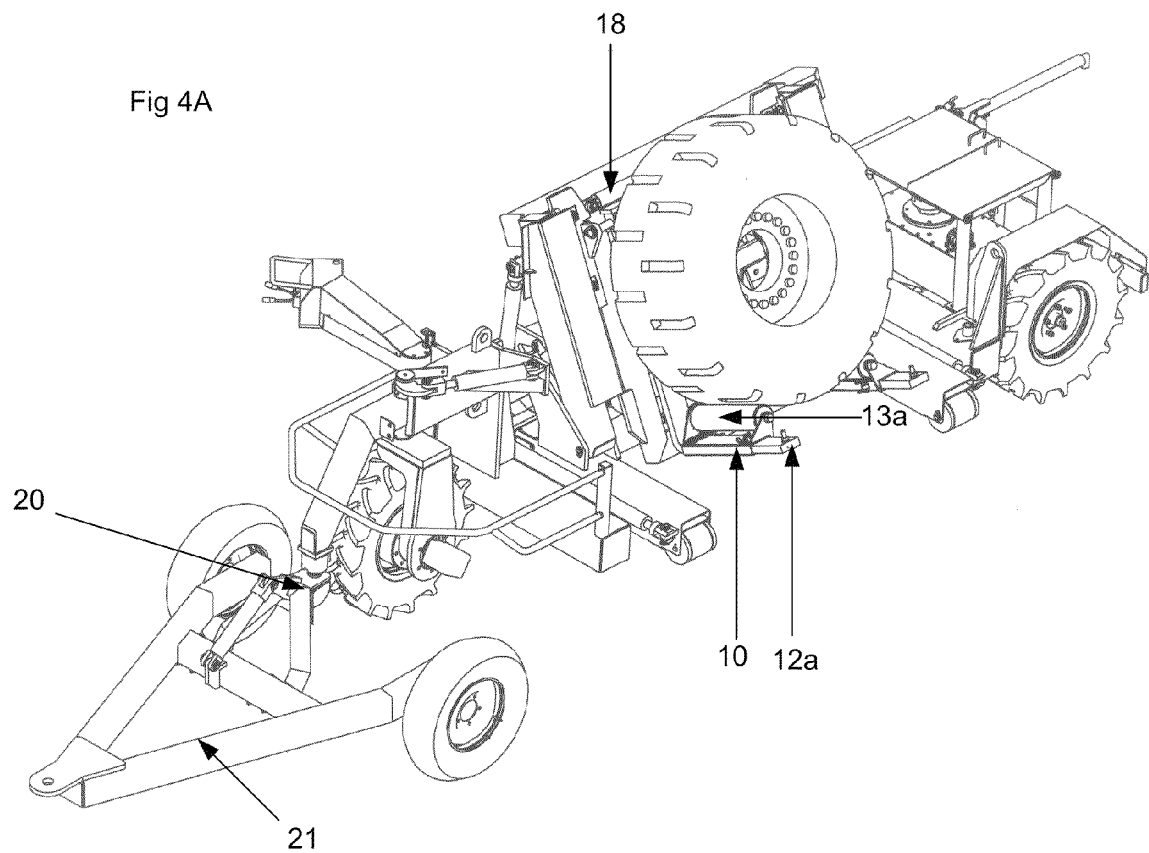

HANDLING DEVICE AND METHOD

BACKGROUND OF THE INVENTION

The present invention relates to an article handling apparatus and method. In particular, the present invention relates to an apparatus and method for transporting an article, such as, but not limited to a wheel or other spare part, and for handling the article in a replacement or installation process. The invention has particular application in the mining and earthmoving fields.

DESCRIPTION OF THE PRIOR ART

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

Mining is centred on the extraction of resources and minerals from the earth. From a productivity point of view, mining typically requires heavy vehicles and machinery capable of moving large amounts of earth and minerals. The components and spare parts of these vehicles are relatively large when compared to those a standard road vehicles. Replacing these oversized spare parts can be an onerous task requiring multiple workmen and in most cases the assistance of bulky machinery that is often difficult to manoeuvre.

If one considers the procedure involved with changing the tyre of a mining vehicle, there are several difficulties to overcome. At first instance, the sheer size of the tyre or wheel can make it almost impossible to transport the tyre to, and align it with, a compatible vehicle. Similarly removing a damaged tyre can be just as onerous. Common lifting equipment such hoists or cranes are bulky and not suitable for use inside narrow mining tunnels. Furthermore such lifting equipment is typically not capable of transporting the tyre in a stable state when travelling over rough uneven surfaces, as is common in the mines. The tyre may often shift or swing around, that may lead to damage of the new tyre or injuries to nearby persons.

It is not uncommon for tyre changing or other spare part replacement to require one machine to transport the part, and another to lift and align it. In some instances the vehicle itself would need to be towed back to the service station or garage to be repaired.

SUMMARY OF THE INVENTION

The present invention seeks to overcome at least some of the disadvantages of the prior art.

The present invention also seeks to provide an apparatus and method of transporting an article in a confined space.

In one broad form, the present invention provides an apparatus for transporting an article, the apparatus including:
 a frame; and
 an article support operatively coupled to the frame,
 wherein the article support is movable relative to the frame such that the apparatus provides a first configuration for retaining the article and a second configuration for receiving or unloading the article.

Preferably, the second configuration is such that the article support orients the article for engagement with a receiving member.

Also preferably, the second configuration is such that at least a portion of the article support protrudes from the frame.

Preferably, the apparatus includes at least one stabilising leg deployable from the frame.

Also preferably, the second configuration is such that the at least one stabilising leg is deployed.

Preferably, the first configuration is such that the at least one stabilising leg is retracted.

Also preferably, the article support is mounted on the at least one stabilising leg.

Preferably, the article support is movable with respect to the stabilising leg.

Also preferably, the stabilising leg includes a roller adapted to engage a substrate surface.

Preferably, the second configuration provides a working space within the frame for access to the article.

Preferably, the apparatus includes a single wheel at one end of the frame.

Also preferably, a protective member extends from the frame around the single wheel.

Also preferably, the article support includes at least one substantially outwardly extending supporting arm.

Preferably, the at least one supporting arm includes a rotatable member.

Preferably, the article support includes a retainer to secure the article.

Also preferably, the article is a wheel or tyre.

Preferably, the article is rotatable in the article support.

Preferably, the article support includes at least one secondary arm for contactingly engaging a wall of the tyre.

Preferably, the at least one secondary arm is adapted to rotate.

Also preferably, the apparatus further includes a control unit for controlling movement of the apparatus, the control unit operatively coupled to a series of hydraulic arms, electric motors and/or other like machinery capable of moving the apparatus.

In yet a further broad form, the present invention provides an article handling apparatus, including:
 a frame,
 a plurality of wheels attached to said frame for movement of said frame over a substrate surface;
 an article support means, supported by and movable relative to said frame between a retracted position wherein said article support means is positioned substantially over said frame, and, an extended position wherein said article support means extends substantially outwardly relative to said frame; and,
 stabilising means, adapted to engage said substrate surface and stabilise said frame when said article support means is moved and positioned in said extended position.

Preferably, said stabilising means is adapted to extend substantially outwardly and downwardly relative to said frame, in a substantially similar direction to the extended position of said article support means.

Preferably, said stabilising means includes roller means at the extremity thereof.

Preferably, the article handling apparatus further includes drive means, including any one or combination of hydraulics, electric motors or the like, to effect movement of said article support means and/or said stabilising means.

Preferably, the article handling apparatus further includes control means, operated in situ or remotely, for a user to control the operation of said article support means, said stabilising means, and/or said wheels over said substrate surface.

Preferably, said frame is substantially elongate in form, and, said article support means and said stabilising means are positioned such that, in their extended position, they extend outwardly in a transverse direction to said frame.

Preferably, said plurality of wheels includes at least one wheel which is steerable.

Also preferably, said steerable wheel is rotatable about a substantially vertical axis.

Preferably, said drive means is adapted to drive said article support means in any direction, that is, upwards or downwards, left or right, or, in or out, for three dimensional movement of said article.

Preferably, said article support means includes support rollers for rotation of an article thereon, such as, but not limited to a wheel or tyre.

Preferably, said article support means is adapted to support a wheel or tyre during installation or removal of said wheel or tyre to a vehicle or other machine.

Preferably, said apparatus is compact and used to supply a wheel, tyre or other article into a space restricted area, such as, but not limited to a mine shaft.

In yet a further broad form, the present invention provides a method of installing or removing an article, such as, but not limited to a wheel or tyre, using the apparatus as hereinbefore defined.

BRIEF DESCRIPTION OF THE DRAWINGS

The present invention will become more fully understood from the following detailed description of preferred but non-limiting embodiments thereof, described in connection with the accompanying drawings wherein.

DETAILED DESCRIPTION OF THE INVENTION

Figure 1A:
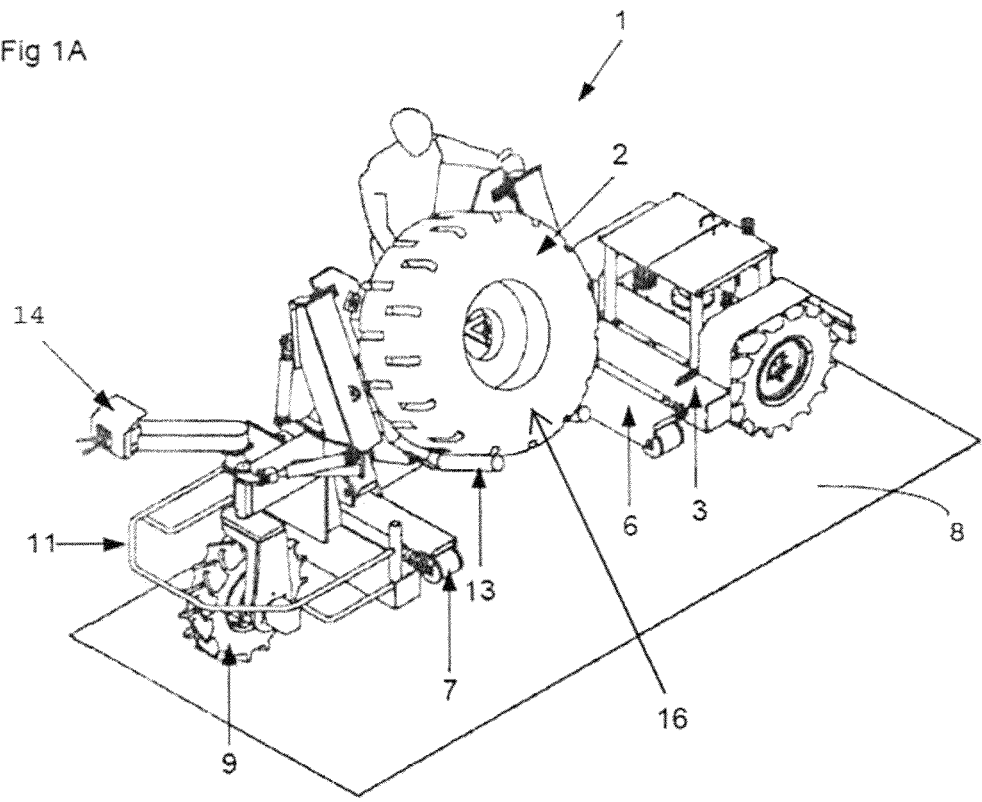
FIG. 1 shows, in FIGS. 1A to 1E, front perspective views of the apparatus in accordance with the present invention showing the progressive steps in moving an article from a transportation position to a working position.

Throughout the drawings, like numerals will be used to identify similar features, except where expressly otherwise indicated.

The apparatus of the present invention, generally designated by the numeral (1), is used to transport an article (2) and manoeuvre it into position. Throughout the drawings, the article (2) is exemplified as a wheel, which may typically be transported on the apparatus (1) through a confined space such as a mine shaft, to replace a wheel on a mining machine which is located within the mine shaft. It will therefore be appreciated that such a wheel changing operation must be conducted within a confined space. It will also be appreciated that such mining equipment wheels are extremely heavy and large. The apparatus of the present invention takes these considerations into account to manoeuvre such a large heavy article as a wheel into position and appropriately manoeuvre the wheel into location on a wheel hub of a stranded mine vehicle.

FIG. 1 illustrates a front perspective view of the various steps of this operation, FIG. 2 illustrates a side elevational view of the various steps of this operation, and FIG. 3 illustrates the various steps from a rear perspective view.

The apparatus (1) includes a frame (3) and an article support (4) operatively coupled to the frame (3). The frame (3) may be a chassis or other central structure that permits attachment of parts and components thereto.

Figure 1B:
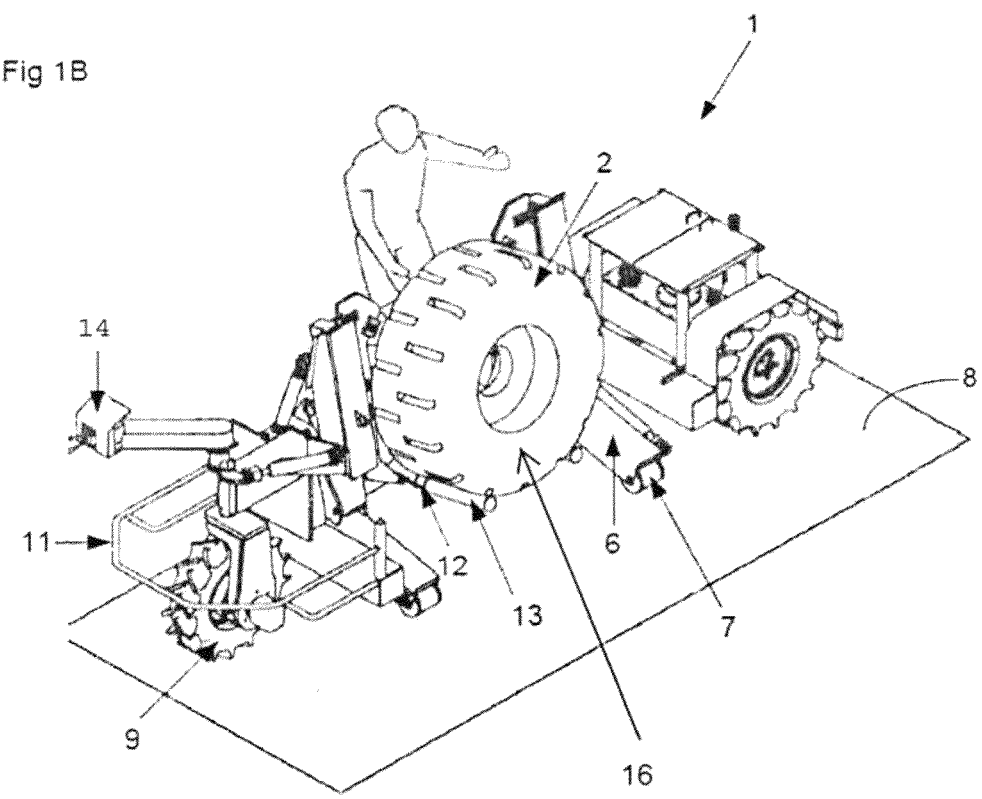

The article support (4), although coupled to the frame (3), is moveable relative to the frame (3) such that the apparatus (1) provides a first configuration for retaining the article (2) and a second configuration for receiving or unloading the article (2). The first configuration shown in FIG. 1A is typically used for transporting the article (2) and may be more compact than the second configuration. The first configuration has the article (2) retained stably and securely in the apparatus (1) such that it cannot fall from the apparatus (1) even during travel over rough uneven surfaces, or otherwise.

FIG. 1E illustrates how the second configuration of the apparatus (1) may be such that the article support (4) orients the article (2) for engagement with a receiving member (not shown). The receiving member could include a compatible vehicle or a storage unit adapted to receive the article (2) but is not limited thereto. The second configuration is typically for unloading or receiving the article (2) and as such, at least a portion of the article support (4) may protrude outwardly from the frame (3). The presentation of the article (2) in this manner provides access to the article (2) with less interference from neighbouring parts of the apparatus (1).

The apparatus (1) may also further include at least one stabilising leg (6) deployable from the frame (3). The first configuration has the stabilising leg retracted whilst the second configuration deploys the stabilising leg to stabilise the apparatus (1). Stabilisation may be required during reception and offload of the article (2) due to a change in the centre of mass of the apparatus (1). The apparatus (1) in the example of FIG. 1 shows two stabilising legs, FIG. 1A shows the retracted position whilst FIG. 1E shows the deployed position. The article support (4) may be separate or mounted upon the stabilising leg(s) (6). The article support (4) also may be moveable with respect to the leg(s) (6). The stabilising leg(s) (6) may include a roller (7) adapted to engage a substrate surface (8), such as the ground or floor. The roller (7) permits the leg(s) (6) to be rolled out to any required distance from the frame (3). Thereafter the leg(s) (6) can be locked into position stabilising the apparatus (1).

It can be seen from FIG. 1E that the second configuration of the apparatus (1) may provide a working space (5) within the frame (3) that permits access to the article (2). A workman, for example, may enter the space to fasten the article (2) to the nearby receiving member or perhaps the article support (4).

FIGS. 1A to 1E, FIGS. 2A to 2F, and FIGS. 3A to 3E show one example of the various views of the apparatus (1) moving between the first configuration and second configuration.

Figure 2A:
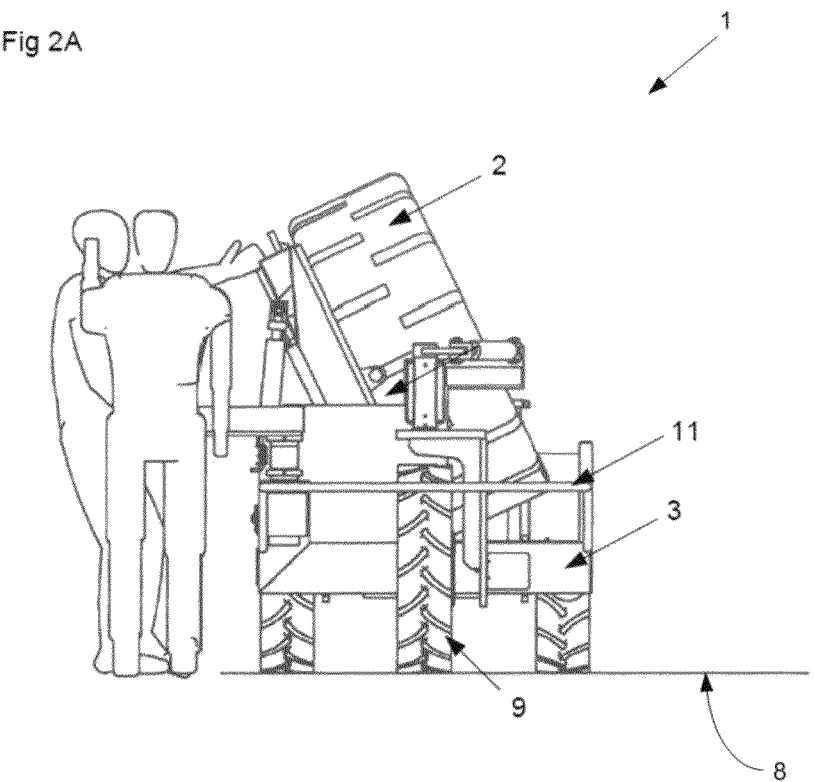
FIG. 2 shows, in FIGS. 2A to 2F, side elevational views of the apparatus in these various steps.
Figure 2B:
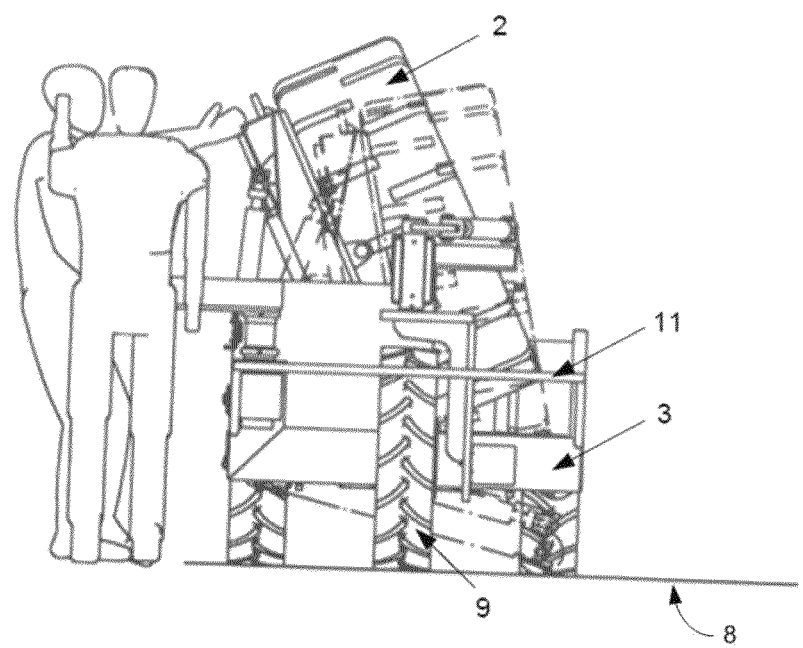
Figure 2C:
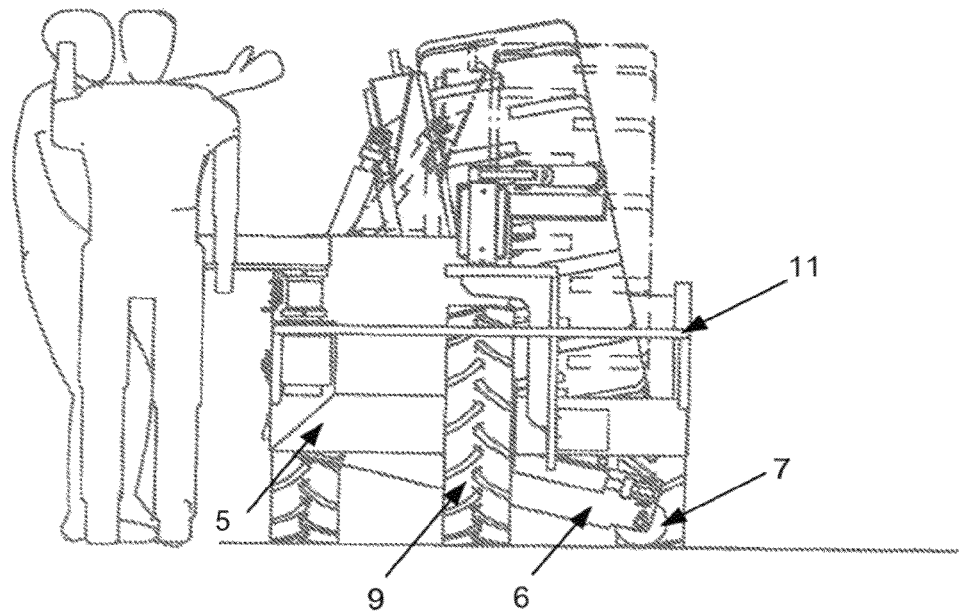
Figure 2D:
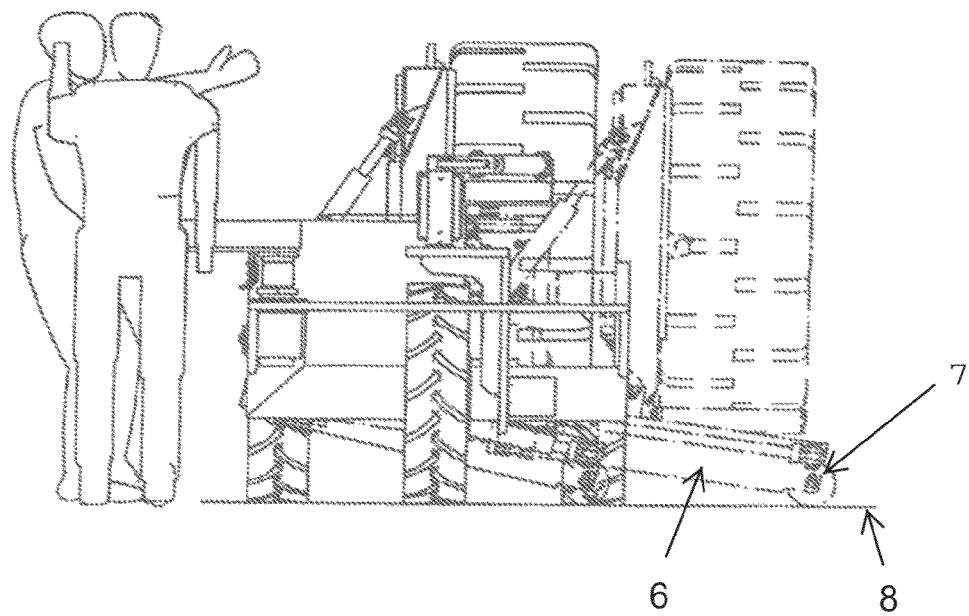
Figure 2E:
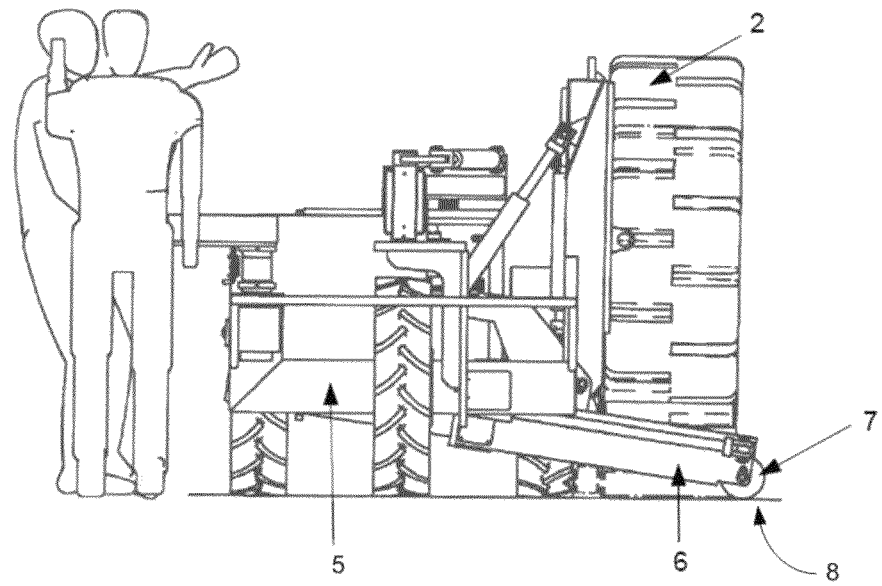
Figure 2F:
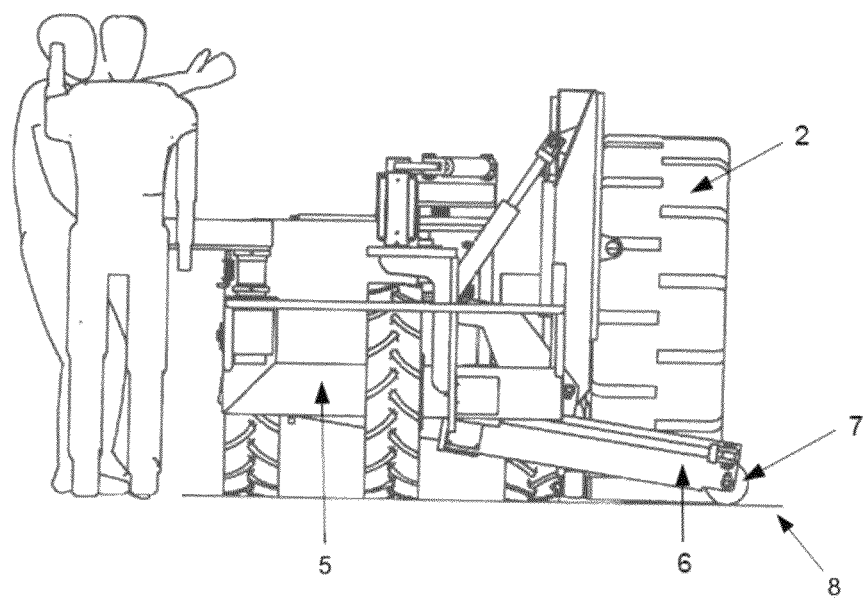
Figure 3A:
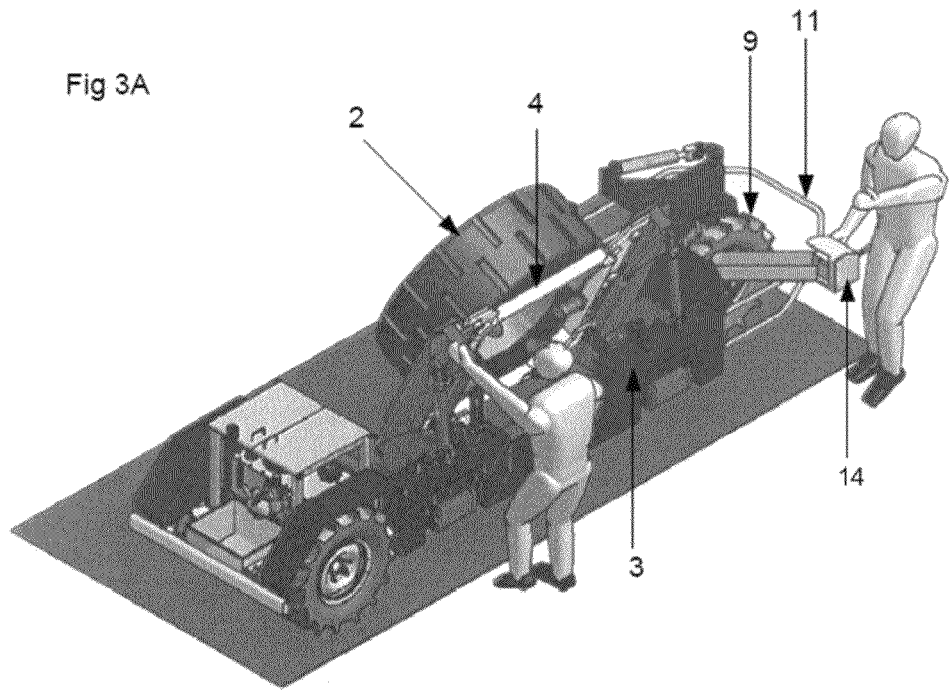
FIG. 3 shows, in FIGS. 3A to 3E respectively, rear perspective views of the apparatus being moved from the transportation position to the working position.
Figure 3B:
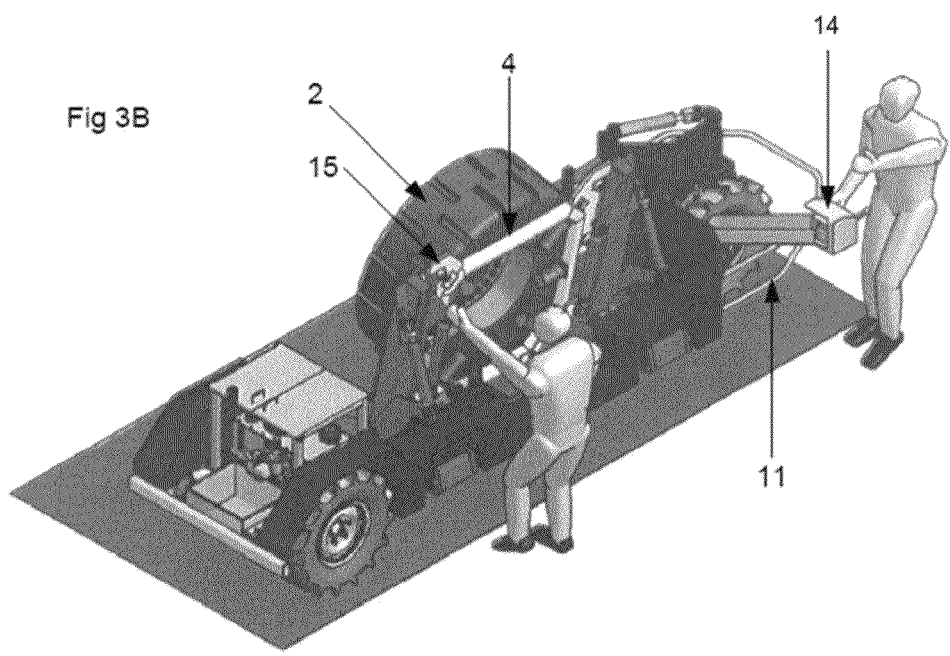

Referring to FIG. 2, FIG. 2A shows an article (2) securely retained in the apparatus (1) such that the apparatus (1) may travel without the article (2) falling off. FIG. 2B shows the beginning of movement into the second configuration. The stabilising leg (6) and article support (4) are lowered such that the roller (7) of the stabilising leg (6) contacts the ground. FIG. 2C shows the article support (4) is then tilted relative to the stabilising leg (6) such that the article (2) is oriented appropriately for engagement with the receiving member. In FIG. 2D the article support (4) and stabilising leg (6) move outwardly from the frame (3) such that they are protruding from the apparatus (1). Now with the apparatus (1) in the second configuration, the article (2) is accessible to a receiving member and also a working space (5) can be provided to access the article (2) from within the frame (3). FIGS. 2E and 2F illustrate how the height and angle of the article support (4) may be adjusted to account for uneven surfaces and varying receiving members.

In one example, the frame (3) of the apparatus (1) has a single wheel (9) at one end. The single wheel (9) can provide the apparatus (1) with more maneuverability, for example, it can provide the apparatus (1) with a smaller turning circle allowing it to rotate in smaller more confined spaces. The example in FIG. 1 shows the apparatus (1) with a single wheel (9) at one end and further, a protective member (11) extending from the frame (3) around the single wheel (9). The protective member (11) may serve to prevent contact between the exposed single wheel and nearby persons.

In some examples the article support (4) includes at least one substantially outwardly extending supporting arm (12). The supporting arm or arms (12) would typically be adapted to support the article (2) in the article support (4). The supporting arms may also include rotatable members (13) such that the article (2) itself is rotatable within the support. The examples of FIGS. 1 to 3 show the rotatable member (13) is a sleeve encasing the arm, and permitted to rotate with respect to the arm. In one of many alternatives, the arm itself may rotate.

FIG. 4 illustrates an alternative example wherein rotatable members (13a) are coupled to supporting arms (12a) in a manner that permits movement of the rotatable members 13(a) along the length of the arms (12a). The rotatable members (13a) are operatively coupled to slideable sleeves (10) through which the arms (12a) may be inserted. Each slideable sleeve (10) is slidable along the length of a respective supporting arm thereby permitting movement of the rotatable members (13a) along the length of the supporting arms (12a). This allows for manual reorientation of the article (2) inward and outward from the article support (4) to assist in fitting of the article to a receiving member.

Figure 4B:
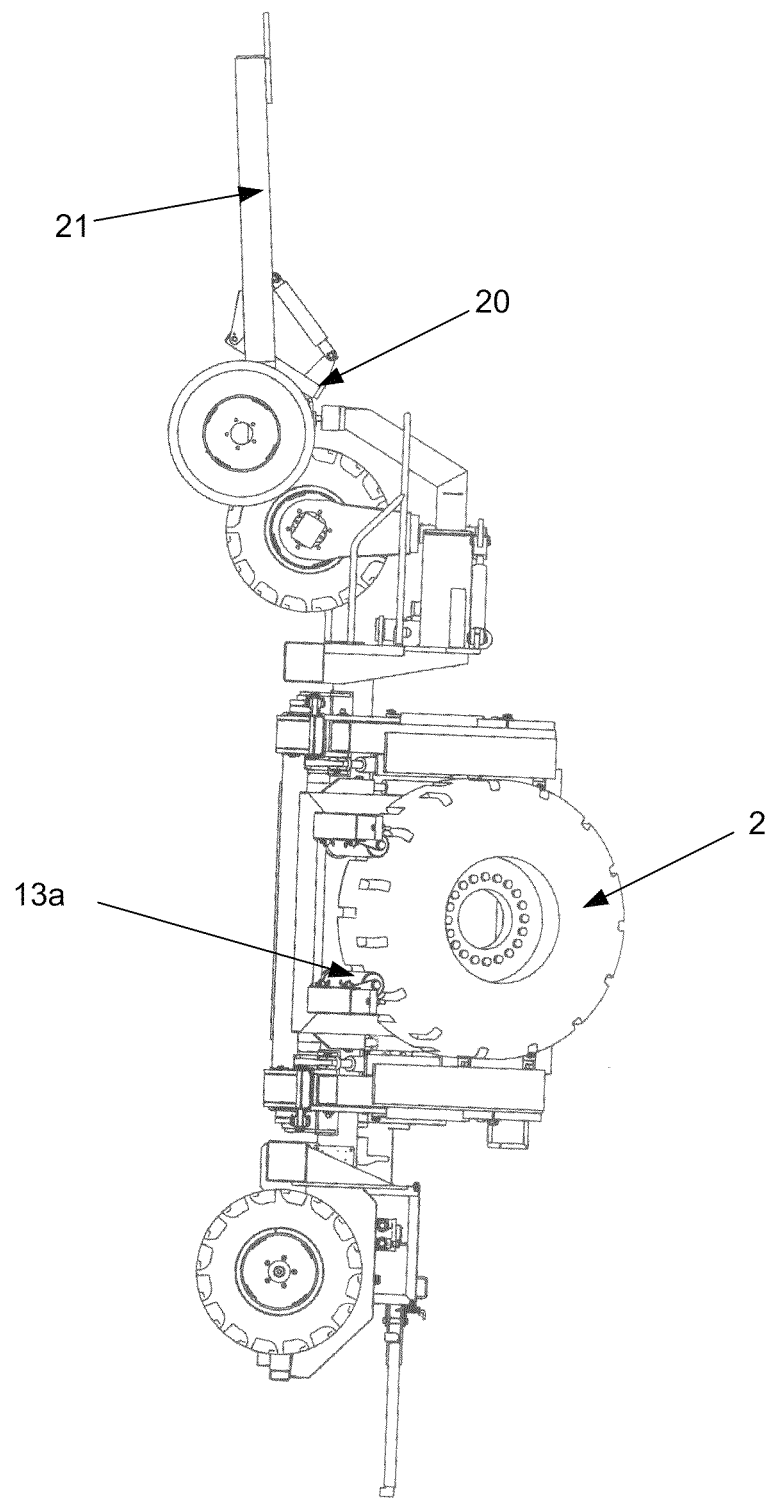
FIG. 4 shows, in FIGS. 4A to 4C respectively, perspective, front and top views of an example of the apparatus with trailer attached.
Figure 4C:
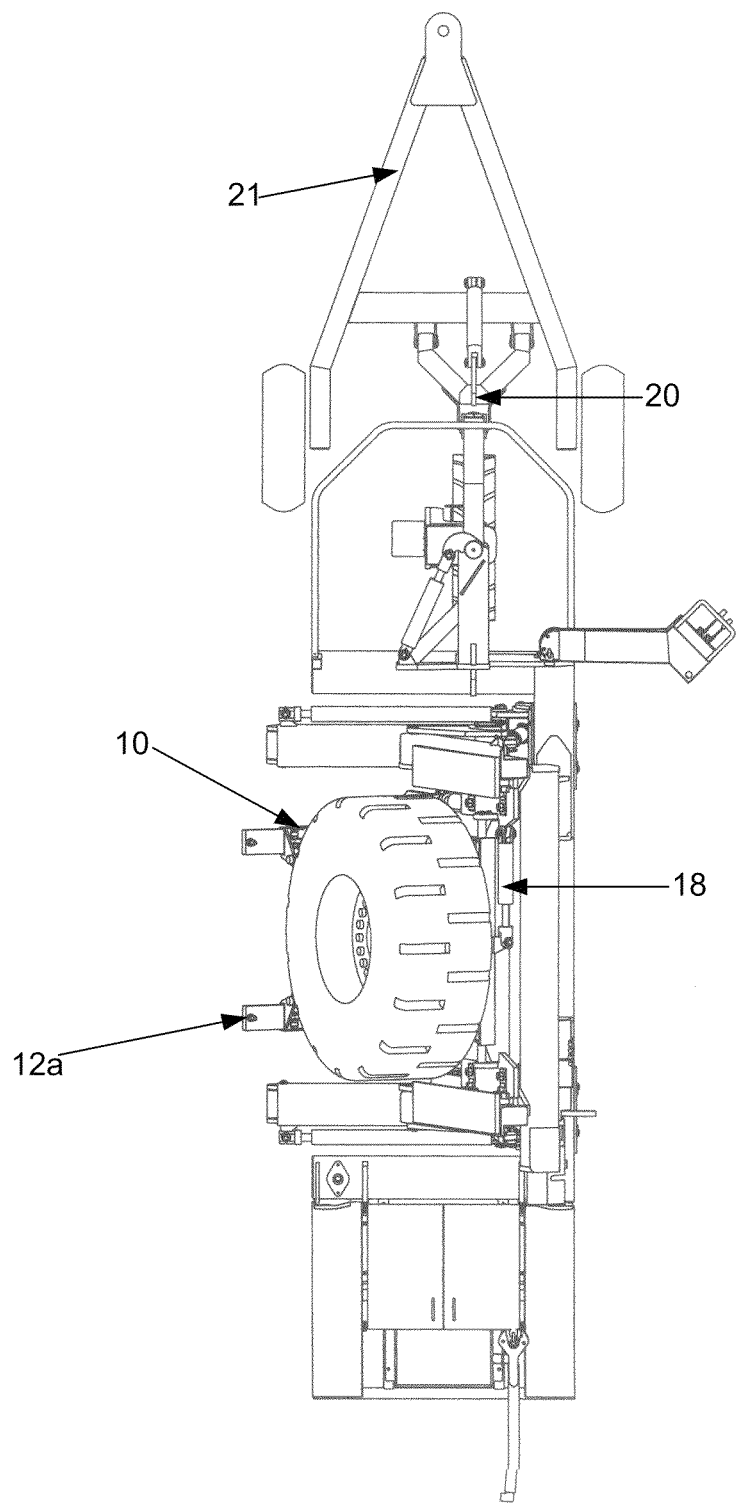

The article may also be moved laterally with respect to the article support. This provides that minor lateral adjustments can be made to fit the article without having to move the entire apparatus by rolling or driving. In FIGS. 4A to 4C the frame is shown to include a hydraulic arm (18) that can be operated to move the article (2) laterally along the article support (4).

FIGS. 4A to 4C also illustrate how the apparatus (1) may also include a trailer coupling arm (20) to allow coupling of a trailer (21) to the apparatus.

The article support (4) can also include a retainer (not shown) coupled to the support (4) to aid in securing the article (2). In one example, the retainer may be a rigid arm hingedly coupled to the article support (4) acting like a latch to retain the article (2). The retainer also may be a strap or cord extendable from the article support (4) around the article (2).

FIGS. 1 and 2 show the apparatus (1) wherein the article (2) for transport is a tyre or wheel. In such examples the apparatus (1) includes at least one secondary arm (15) for contactly engaging the wall (16) of a retained tyre. The secondary arms (15) may be adapted to rotate such that rotating a tyre within the support is encouraged.

The apparatus (1) may also include a control unit (14) for controlling movement of the apparatus (1). Typically the control unit (14) would be operatively coupled to a series of hydraulic arms, electric motors and/or other like machinery of capable of moving the components of the apparatus (1).

In one example the apparatus may be used in mines to transport spare tyres within the tunnels to mining vehicles. The apparatus retaining the tyre in the compact first configuration could move into small constricting spaces adjacent to a receiving vehicle. The single wheel also allows maneuverability necessary for travel in the narrow tunnels. When suitably aligned with a vacant axle of a compatible vehicle the apparatus can adopt the second configuration presenting the article for engagement with the axle. The tyre can be rotated within the support such that the tyre may be aligned correctly for coupling to the vehicle. The second configuration also provides a space within the frame such that a workman or mine engineer can get access to the tyre and fasten it appropriately to the vehicle. Similarly the apparatus can be positioned appropriately for removal of damaged tyre from a vehicle.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

Finally, it can be understood that the inventive concept in any of its aspects can be incorporated in many different constructions so that generality of the preceding description is not superseded by the particularity of the attached drawings. Various alterations, modifications and/or additions may be incorporated into the various constructions and arrangements of parts without departing from the spirit or ambit of the present invention.

What is claimed is:
1. An article handling apparatus, including:
a frame;
a plurality of wheels attached to said frame, for movement of said frame over a substrate surface;
an article support operatively connected to said frame;
at least one stabilising leg deployable from said frame, each stabilising leg including a roller at an extremity thereof;
a plurality of actuating mechanisms for movement of said article support and said at least one stabilising leg;
a controller that is configured to output control signals when actuated by a user to enable the user to selectively control movement and operation of said actuating mechanisms between:
a first configuration in which said frame may be moved over said substrate surface, wherein said article support is positioned substantially over said frame, and wherein said at least one stabilising leg is in a retracted position and not contacting said substrate surface; and,
a second configuration, in which said article may be received onto or unloaded from said article support, wherein said article support protrudes from said frame, and wherein said roller on said at least one stabilising leg contacts said substrate surface,
whereby, in said second configuration, as said user controls the movement of said article via said controller, said actuating mechanisms operate to move said article support whilst said stabilising leg(s) simultaneously move relative to the frame, and travel on said wheels over said substrate surface to stabilise said apparatus.

2. An apparatus as claimed in claim 1 wherein in the second configuration, the article support orients the article for engagement with a receiving member.

3. An apparatus as claimed in claim 1 wherein the article support is mounted on the at least one stabilising leg.

4. An apparatus as claimed in claim 1 wherein the article support is movable with respect to the stabilising leg.

5. An apparatus as claimed in claim 1 wherein the second configuration provides a working space within the frame for access to the article.

6. An apparatus as claimed in claim 1 wherein said plurality of wheels includes a single wheel at one end of the frame.

7. An apparatus as claimed in claim 6 wherein a protective member extends from the frame around the single wheel.

8. An apparatus as claimed in claim 1 wherein the article support includes at least one substantially outwardly extending supporting arm.

9. An apparatus as claimed in claim 8 wherein the at least one supporting arm includes a rotatable member.

10. An apparatus as claimed in claim 1 wherein the article is a wheel or tyre.

11. An apparatus as claimed in claim 1 wherein the article is rotatable in the article support.

12. An apparatus as claimed in claim 10 wherein the article support includes at least one secondary arm for contactingly engaging a wall of the tyre.

13. An apparatus as claimed in claim 12 wherein the at least one secondary arm is adapted to rotate.

14. An article handling apparatus as claimed in claim 1, wherein
said plurality of wheels includes at least one wheel which is steerable.

15. An article handling apparatus as claimed in claim 1, wherein
said controller may be used to control movement of said article support in any direction, that is, upwards or downwards, left or right, or, in or out, for three dimensional movement of said article support.

16. An Apparatus as in claim 1, wherein the actuating mechanisms comprise a hydraulic actuating mechanism.

* * * * *